United States Patent
Tai

(10) Patent No.: US 11,397,531 B2
(45) Date of Patent: Jul. 26, 2022

(54) METHOD AND APPARATUS FOR PERFORMING DATA PROTECTION REGARDING NON-VOLATILE MEMORY

(71) Applicant: Realtek Semiconductor Corp., HsinChu (TW)

(72) Inventor: Chang-Hsien Tai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 18 days.

(21) Appl. No.: 17/209,172

(22) Filed: Mar. 22, 2021

(65) Prior Publication Data

US 2021/0303183 A1 Sep. 30, 2021

(30) Foreign Application Priority Data

Mar. 24, 2020 (TW) .................................. 109109824

(51) Int. Cl.
*G06F 12/00* (2006.01)
*G06F 3/06* (2006.01)

(52) U.S. Cl.
CPC .......... *G06F 3/0623* (2013.01); *G06F 3/0619* (2013.01); *G06F 3/0659* (2013.01); *G06F 3/0679* (2013.01)

(58) Field of Classification Search
CPC .... G06F 3/0623; G06F 3/0619; G06F 3/0659; G06F 3/0679; G06F 3/064; G06F 3/0688; G06F 21/85; G06F 3/062; G06F 21/71
USPC ........................................................ 711/154
See application file for complete search history.

(56) References Cited

U.S. PATENT DOCUMENTS

| | | | |
|---|---|---|---|
| 6,324,672 B1 | 11/2001 | Lawman | |
| 7,340,693 B2 | 3/2008 | Martin | |
| 8,291,238 B2 * | 10/2012 | Ginter | G06F 21/51 713/193 |
| 8,549,246 B2 | 10/2013 | Pekny | |
| 10,062,420 B2 | 8/2018 | Pekny | |
| 10,192,591 B2 | 1/2019 | Pekny | |

(Continued)

FOREIGN PATENT DOCUMENTS

| | | | | |
|---|---|---|---|---|
| JP | 2015531924 A | * | 1/2015 | |
| JP | 6741675 B2 | * | 8/2020 | ........... G06F 21/606 |

OTHER PUBLICATIONS

Micron, "Micron Unveils Secure NOR Flash Memory Solution to Accelerate and Authenticate Intelligence at the Edge", Nov. 14, 2018, USA., http://investors.micron.com/news-releases/news-release-details/micron-unveils-secure-nor-flash-memory-solution-accelerate-and.

*Primary Examiner* — Mardochee Chery
(74) *Attorney, Agent, or Firm* — Winston Hsu

(57) ABSTRACT

A method and apparatus for performing data protection regarding a non-volatile memory (NVM) are provided. The method includes: obtaining a first die-dependent seed and a second die-dependent seed, where the first die-dependent seed and the second die-dependent seed correspond to a die for implementing the NVM; performing rearrangement on multiple sets of address information of an address according to the first die-dependent seed, for protecting the address carried by at least one address signal between the controller and the NVM; and performing rearrangement on multiple subsets of a set of data according to the second die-dependent seed, for protecting the set of data carried by at least one data signal between the controller and the NVM.

20 Claims, 10 Drawing Sheets

(56) References Cited

U.S. PATENT DOCUMENTS

| | | |
|---|---|---|
| 10,296,421 B2 | 5/2019 | Mondello |
| 10,311,236 B2 | 6/2019 | Nadarajah |
| 10,313,328 B2 | 6/2019 | Bettenburg |
| 2014/0181532 A1* | 6/2014 | Camp ............... G06F 21/79 713/190 |
| 2021/0011634 A1* | 1/2021 | Tumkur Shivanand ............... G06F 3/0622 |

* cited by examiner

METHOD AND APPARATUS FOR PERFORMING DATA PROTECTION REGARDING NON-VOLATILE MEMORY

BACKGROUND OF THE INVENTION

1. Field of the Invention

The present invention is related to memory control, and more particularly, to a method for performing data protection regarding a non-volatile memory (NVM), and associated apparatus such as a controller and an electronic device comprising the controller.

2. Description of the Prior Art

A side channel attack is where a hacker may perform reverse engineering through a logic analyzer or a current meter according to read or write behaviors of a controller integrated circuit (IC) upon a flash memory. This may involve performing a relevance analysis to determine that a program is performing certain calculation, and further analyzing patterns to attack a certain read or write address. The related art provides a protection method related to content encryption to try to solve the above problems, but this may result in additional problems. For example, calculation related to the above protection method (more particularly, encryption/decryption) costs time, which may degrade a system performance. In addition, although a vendor may encrypt different versions of firmware, the hacker may directly replace an old memory within an old electronic product with a new memory within a new electronic product, to make a new version firmware be able to run on an old version IC platform for analyzing read or write patterns, which greatly threatens system security. Thus, there is a need for a novel method and associated architecture, to solve the problems of the related art without introducing any side effect or in a way that is less likely to introduce side effects.

SUMMARY OF THE INVENTION

An objective of the present invention is to provide a method for performing data protection regarding a non-volatile memory (NVM), and an associated apparatus such as a controller and an electronic device comprising the controller, to solve the problems of the related art.

At least one embodiment of the present invention provides a method for performing data protection regarding an NVM, wherein the method is applicable to a controller. The method comprises: obtaining a first die-dependent seed and a second die-dependent seed, wherein the first die-dependent seed and the second die-dependent seed correspond to a die for implementing the NVM; performing rearrangement on multiple sets of address information of an address according to the first die-dependent seed in order to protect the address carried by at least one address signal between the controller and the NVM; and performing rearrangement on multiple subsets of a set of data according to the second die-dependent seed in order to protect the set of data carried by at least one data signal between the controller and the NVM.

In addition to the aforementioned method, the present invention also provides a controller. The controller is applicable to data protection regarding an NVM. The controller comprises a core circuit, an address information rearrangement circuit coupled to the core circuit, and a data conversion circuit coupled to the core circuit. The core circuit may be configured to control the controller according to predetermined information loaded from the NVM, for controlling operations of an electronic device, wherein the electronic device comprises the controller and the NVM. In addition, the address information rearrangement circuit may be configured to perform address information rearrangement, wherein the address information rearrangement circuit obtains a first die-dependent seed, and performs rearrangement on multiple sets of address information of an address according to the first die-dependent seed, in order to protect the address carried by at least one address signal between the controller and the NVM. Furthermore, the data conversion circuit may be configured to perform data conversion, wherein the data conversion circuit obtains a second die-dependent seed, and performs rearrangement on multiple subsets of a set of data according to the second die-dependent seed, in order to protect the set of data carried by at least one data signal between the controller and the NVM. For example, the first die-dependent seed and the second die-dependent seed correspond to a die for implementing the NVM.

According to some embodiments, the present invention also provides an electronic device comprising the aforementioned controller, wherein the electronic device comprises the NVM.

In addition to the aforementioned method, the present invention also provides an apparatus for performing data protection regarding an NVM. The apparatus comprises an address information rearrangement circuit and a data conversion circuit. The address information rearrangement circuit may be configured to perform address information rearrangement, wherein the address information rearrangement circuit obtains a first die-dependent seed, and performs rearrangement on multiple sets of address information of an address according to the first die-dependent seed, in order to protect the address carried by at least one address signal between a controller and the NVM. Furthermore, the data conversion circuit may be configured to perform data conversion, wherein the data conversion circuit obtains a second die-dependent seed, and performs rearrangement on multiple subsets of a set of data according to the second die-dependent seed, in order to protect the set of data carried by at least one data signal between the controller and the NVM. For example, the first die-dependent seed and the second die-dependent seed correspond to a die for implementing the NVM.

The method and associated apparatus provided by the present invention can ensure the electronic device is able to properly operate under various conditions, where examples of the aforementioned associated apparatus may include: the controller, the electronic device, etc. Furthermore, implementing the embodiments of the present invention will not greatly increase additional costs. Thus, the problems of the related art can be solved. In comparison with the related art, the present invention can implement a robust data protection mechanism without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
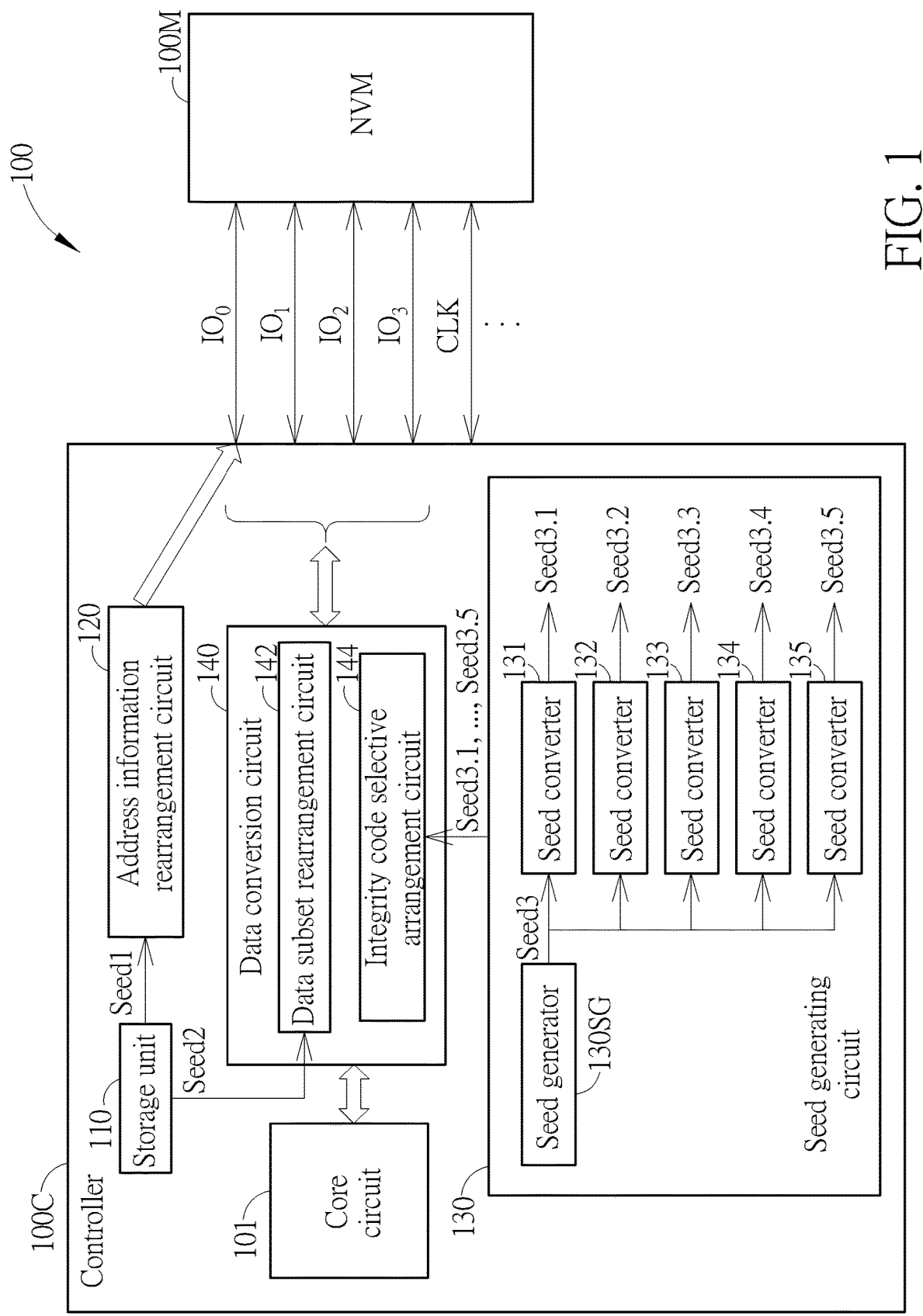
FIG. 1 is a diagram illustrating an electronic device according to an embodiment of the present invention.

FIG. 1 is a diagram illustrating an electronic device 100 according to an embodiment of the present invention. The electronic device 100 may comprise a controller 100C and a non-volatile memory (NVM) 100M coupled to each other, but the present invention is not limited thereto. For example, the electronic device 100 may further comprise other components such as a touch-sensitive display module, one or more audio output modules, one or more wireless transmission modules, etc., where at least one portion (e.g. one portion or all) of these components may be coupled to one another via a bus, and may be coupled to a controller 100C. For better comprehension, examples of the electronic device 100 may include, but are not limited to: a multi-functional mobile phone, a wearable device, a tablet and a personal computer such as a laptop computer.

The controller 100C may comprise a core circuit 101, a storage unit 110, an address information rearrangement circuit 120, a seed generating circuit 130 and a data conversion circuit 140. More particularly, the seed generating circuit 130 may comprise a seed generator 130SG (e.g. a timer) and multiple seed converters 131, 132, 133, 134 and 135, and the data conversion circuit 140 may comprise a data subset rearrangement circuit 142 and an integrity code selective arrangement circuit 144, where the address information rearrangement circuit 120 and the data conversion circuit 140 may be coupled between the core circuit 101 and an NVM interface circuit of the controller 100C, and the NVM interface circuit may perform read or write operations on the NVM 100M for the controller 100C through a set of signals such as $IO_0$, $IO_1$, $IO_2$, $IO_3$, CLK, etc. between the controller 100C and the NVM 100M, but the present invention is not limited thereto. In some embodiments, at least one portion (e.g. one portion or all) of the storage unit 110, the address information rearrangement circuit 120, the seed generating circuit 130 and the data conversion circuit 140 may be integrated into the core circuit 101. In addition, the controller 100C (e.g. the NVM interface circuit thereof) may conform to a Joint Electron Device Engineering Council (JEDEC) specification or other specifications.

According to this embodiment, the core circuit 101 may control operations of the electronic device 100 according to predetermined information loaded from the NVM 100M. In addition, the controller 100C is applicable to data protection regarding the NVM 100M, to withstand various operations performed by a hacker. The address information rearrangement circuit 120 and the data conversion circuit 140 may perform address information rearrangement and data conversion, respectively, and more particularly, through associated control of some seeds such as multiple die-dependent seeds Seed1 and Seed2 stored in the storage unit 110 in advance and multiple converted seeds Seed3.1, Seed3.2, Seed3.3, Seed3.4 and Seed3.5 generated by the seed generating circuit 130, for performing data protection. For example, the storage unit 110 may provide the die-dependent seed Seed1 to the address information rearrangement circuit 120, to make the address information rearrangement circuit 120 perform the address information rearrangement according to the die-dependent seed Seed1, and the storage unit 110 and the seed generating circuit 130 may provide the die-dependent seed Seed2 and the converted seeds Seed3.1, Seed3.2, Seed3.3, Seed3.4 and Seed3.5 to the data conversion circuit 140, respectively, to make the data conversion circuit 140 (e.g. the data subset rearrangement circuit 142) perform the data conversion according to the die-dependent seed Seed2 and the converted seeds Seed3.1, Seed3.2, Seed3.3, Seed3.4 and Seed3.5. The data conversion may comprise data subset rearrangement, and more particularly, may further comprise integrity code selective arrangement, where the data subset rearrangement circuit 142 may perform the data subset rearrangement according to the die-dependent seed Seed2, and the integrity code selective arrangement circuit 144 may perform the integrity code selective arrangement according to the converted seeds Seed3.1, Seed3.2, Seed3.3, Seed3.4 and Seed3.5, but the present invention is not limited thereto.

As shown in FIG. 1, the seed generator 130SG may generate an initial seed Seed3, and the seed converter 131, 132, 133, 134 and 135 may convert the initial seed Seed3 into the converted seeds Seed3.1, Seed3.2, Seed3.3, Seed3.4 and Seed3.5, respectively, for performing the data conversion. Note that the initial seed Seed3 may vary and be updated with time and the converted seeds Seed3.1, Seed3.2, Seed3.3, Seed3.4 and Seed3.5 may vary and be updated with the initial seed Seed3. Thus, the data conversion of these seeds introduces various changes of data signals (e.g. the signals $IO_0$, $IO_1$, $IO_2$ and $IO_3$, and more particularly, data being transmitted through these signals) between the controller 100C and the NVM 100M.

The die-dependent seeds Seed1 and Seed2 may correspond to a die for implementing the NVM 100M. When the die is replaced with another die for implementing the NVM 100M, the die-dependent seeds Seed1 and Seed2 may be updated to correspond to the aforementioned other die. For example, multiple electronic devices {100} may be obtained through mass production. Regarding multiple dies respectively arranged for implementing respective NVMs {100M} of these electronic devices {100}, the die-dependent seeds Seed1 and Seed2 of each die are different from the die-dependent seeds Seed1 and Seed2 of any other die, respectively. Based on the architecture shown in FIG. 1, the present invention can implement a robust data protection mechanism without introducing any side effect or in a way that is less likely to introduce side effects.

In the aforementioned embodiments, the NVM 100M may be implemented by a flash memory such as a NAND type flash memory, a NOR type flash memory, or an electrically-erasable programmable read-only memory (EPROM), etc. In addition, the storage unit 110 may be implemented by a one-time programming memory component such as an electronic fuse (e-fuse), or a register such as a secured register, etc. For example, the storage unit 110 may comprise at least one e-fuse and/or at least one secured register. Furthermore, the address information rearrangement circuit 120 and the data conversion circuit 140 (more particularly, the data subset rearrangement circuit 142 therein) may be implemented by multiple sets of switches. For example, the address information rearrangement circuit 120 may comprise a set of switches, and this set of switches may be configured to perform exchange on two or more address lines within a set of address lines according to the die-dependent seed Seed1, for performing the address information rearrangement. In another example, the data conversion circuit 140 (more particularly, the data subset rearrangement circuit 142 therein) may comprise a set of switches, and this set of switches may be configured to perform exchange on two or more data lines within a set of data lines according to the die-dependent seed Seed2, for performing the data subset rearrangement.

Figure 2:
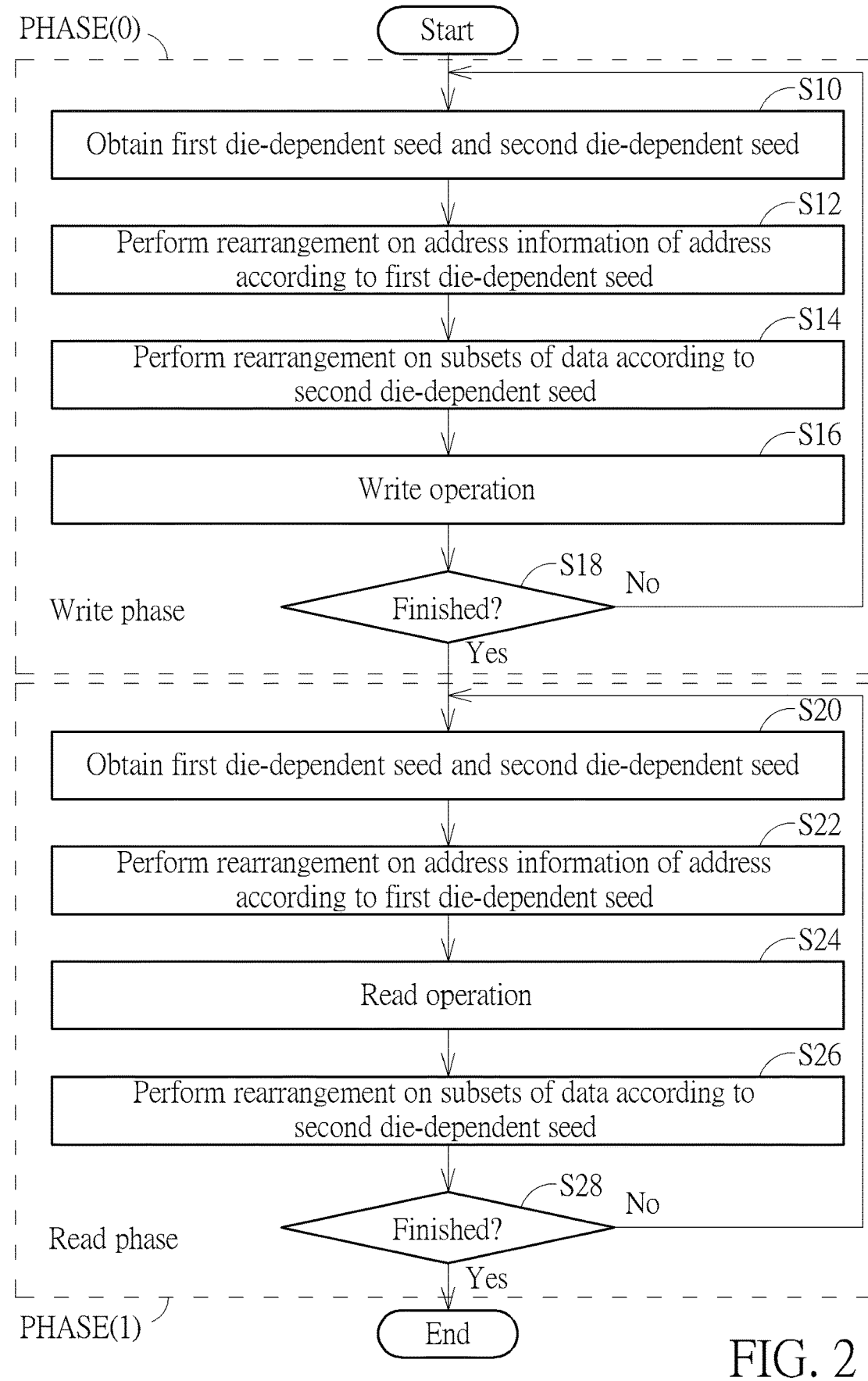
FIG. 2 is a flowchart illustrating a method for performing data protection regarding an NVM according to an embodiment of the present invention.

FIG. 2 is a flowchart illustrating a method for performing data protection regarding an NVM such as the NVM 100M shown in FIG. 1 according to an embodiment of the present invention. The method may be applied to the associated apparatus such as the controller 100C, the electronic device 100 comprising the controller 100C, etc., and may be executed by the controller 100C. Steps S10 to S18 and S20 to S28 may be executed in a write phase PHASE(0) (e.g. a production phase) and a read phase PHASE(1) (e.g. a terminal user phase) of the electronic device 100, but the present invention is not limited thereto. For better comprehension, a first die-dependent seed and a second die-dependent seed mentioned in the working flow shown in FIG. 2 may be illustrated as the die-dependent seeds Seed1 and Seed2.

In Step S10, the controller 100C obtains the die-dependent seeds Seed1 and Seed2. For example, the address information rearrangement circuit 120 and the data conversion circuit 140 may obtain the die-dependent seeds Seed1 and Seed2 from the storage unit 110, respectively.

In Step S12, the controller 100C (e.g. the address information rearrangement circuit 120) performs rearrangement on multiple sets of address information of an address according to the die-dependent seed Seed1, for protecting the address carried by at least one address signal between the controller 100C and the NVM 100M, where the address in the write phase PHASE(0) may represent a write address. For example, the controller 100C may utilize the set of switches within the address information rearrangement circuit 120 for performing exchange on two or more address lines within a set of address lines according to the die-dependent seed Seed1, to rearrange the multiple sets of address information of the address.

In Step S14, the controller 100C (e.g. the data conversion circuit 140) performs rearrangement on multiple subsets of a set of data (e.g. a set of write data) according to the die-dependent seed Seed2, for protecting the set of data carried by at least one data signal between the controller 100C and the NVM 100M. For example, the controller 100C may utilize the set of switches of the data conversion circuit 140 (more particularly, the data subset rearrangement circuit 142 therein) for performing exchange on two or more data lines within a set of data lines according to the die-dependent seed Seed2, to rearrange the multiple subsets of the set of data.

In Step S16, the controller 100C performs a write operation on the NVM 100M according to the address (e.g. the write address) mentioned in Step S12, and more particularly, writes the set of data that is rearranged into the NVM 100M.

In Step S18, the controller 100C determines whether the write operation within the write phase PHASE(0) is finished. If the determination is "Yes", the controller 100C may leave the write phase PHASE(0), e.g. may enter the read phase PHASE(1) during subsequent boot-up (e.g. the next boot-up), and more particularly, may enter Step S20; if the determination is "No", the controller may stay in the write phase PHASE(0) to keep performing the write operation, and more particularly, may enter Step S10.

In Step S20, the controller 100C obtains the die-dependent seeds Seed1 and Seed2. For example, the address information rearrangement circuit 120 and the data conversion circuit 140 may obtain the die-dependent seeds Seed1 and Seed2 from the storage unit 110, respectively.

In Step S22, the controller 100C (e.g. the address information rearrangement circuit 120) performs multiple sets of address information of an address according to the die-dependent seed Seed1, for protecting the address carried by at least one address signal between the controller 100C and the NVM 100M, where the address in the read phase PHASE(1) may represent a read address. For example, the controller 100C may utilize the set of switches within the address information rearrangement circuit 120 for performing exchange on two or more address lines within the set of address lines according to the die-dependent seed Seed1, to rearrange the multiple sets of address information of this address.

In Step S24, the controller 100C performs a read operation on the NVM 100M according to the address mentioned in Step S22, and more particularly, reads a set of data (e.g. a set of read data) from the NVM 100M. For example, this set of data may be loaded into a random access memory (RAM) within the controller 100C, but the present invention is not limited thereto.

In Step S26, the controller 100C (e.g. the data conversion circuit 140) performs rearrangement on multiple subsets of the set of data (e.g. the set of read data) within Step S24 according to the die-dependent seed Seed2, for protecting the set of data carried by at least one data signal between the controller 100C and the NVM 100M. For example, the controller 100C may utilize the set of switches within the data conversion circuit 140 (e.g. the data subset rearrangement circuit 142 therein) for performing exchange on two or more data lines within the set of data lines according to the die-dependent seed Seed2, to rearrange the multiple subsets of this set of data.

In Step S28, the controller 100C determines whether the read operation within the read phase PHASE(1) is finished. If the determination is "Yes", the controller 100C may leave the read phase PHASE(1) to end the working flow shown in FIG. 2; if the determination is "No", the controller 100C may stay in the read phase PHASE(1) to keep performing the read operation, and more particularly, enter Step S20. For example, when leaving the read phase PHASE(1), the controller 100C has loaded the predetermined information (e.g. program-associated information such as multiple commands and data thereof) into the RAM, for controlling the operations of the electronic device 100, but the present invention is not limited thereto.

For better comprehension, the method may be illustrated by the working flow shown in FIG. 2, but the present invention is not limited thereto. According to some embodiments, one or more steps may be added, deleted or modified in the working flow shown in FIG. 2.

According to some embodiments, the NVM 100M shown in FIG. 1 may comprise a corresponding NVM side data protection circuit architecture, which may be equivalent to a controller side data protection circuit architecture constituted by the storage unit 110, the address information rearrangement circuit 120, the seed generating circuit 130 and the data conversion circuit 140, which operates according to the above method, but the present invention is not limited thereto. For example, assume that a series of available addresses for the controller 100C to control the NVM 100M are valid addresses, and respectively represent a series of storage locations with the same size, such as a series of pages. Seed1 may be a seed varying according to a predetermined sequence, wherein regarding a same die, the predetermined sequence is the same regardless of the write phase PHASE(0) or the read phase PHASE(1). Under this condition, no matter how the set of address lines are exchanged, the set of data within the write phase PHASE(0) such as the set of write data may be write into a certain location within the NVM 100M, and may be read according to the same address line exchange. Thus, the NVM 100M does not need to perform reverse rearrangement of the address information rearrangement, and does not need to configure a corresponding reverse address information rearrangement circuit, either. In addition, Seed2 may be a seed varying according to another predetermined sequence, wherein regarding a same die, the aforementioned another predetermined sequence is the same regardless of the write phase PHASE(0) or the read phase PHASE(1). Under this condition, no matter how the set of data lines are exchanged, the set of data within the write phase PHASE(0) such as the set of write data may be written into a certain location within the NVM 100M, and may be read for being recovered according to the same data line exchange. Thus, the NVM 100M does not need to perform reverse rearrangement of the data subset rearrangement, and does not need to configure a corresponding reverse data subset rearrangement circuit, either.

According to some embodiments, the controller 100C may parse a header within information from the NVM 100M, to obtain the die-dependent seeds Seed1 and Seed2 from the header, and provide the die-dependent seeds Seed1 and Seed2 to the address information rearrangement circuit 120 and the data conversion circuit 140. For example, the aforementioned corresponding NVM side data protection circuit architecture may obtain the die-dependent seeds Seed1 and Seed2 from a corresponding storage unit (e.g. a e-fuse or a secured register) therein, embed or insert the die-dependent seeds Seed1 and Seed2 into the header, and combine the header and encrypted data such as an image, for being transmitted to the controller 100C.

Figure 3:
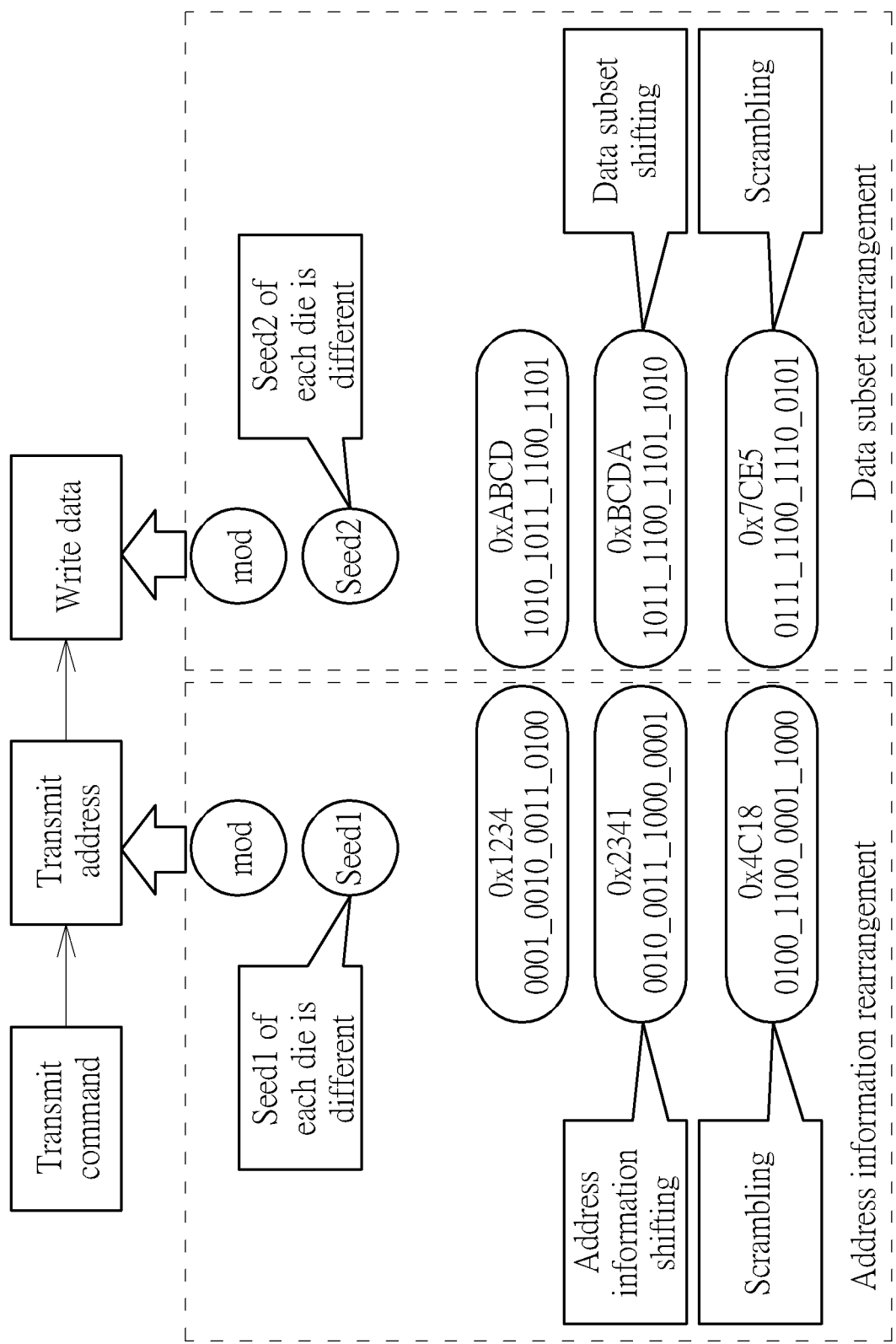
FIG. 3 illustrates a write control scheme of the method shown in FIG. 2 according to an embodiment of the present invention.

FIG. 3 illustrates a write control scheme of the method shown in FIG. 2 according to an embodiment of the present invention. Regarding the address information rearrangement circuit 120, the address information rearrangement may comprise address information shifting, e.g. shifting a binary version 0001_0010_0011_0100 of 0x1234, to be a binary version 0010_0011_0100_0001 of 0x2341. In particular, the address information rearrangement may further comprise scrambling, e.g. scrambling a binary version 0010_0011_0100_0001 of 0x2341 to be a binary version 0100_1100_0001_1000 of 0x4C18. Regarding the data subset rearrangement circuit 142, the data subset rearrangement may comprise data subset shifting, e.g. shifting a binary version 1010_1011_1100_1101 of 0xABCD to be a binary version 1011_1100_1101_1010 of 0xBCDA. In particular, the data subset rearrangement may further comprise scrambling, e.g. scrambling a binary version 1011_1100_1101_1010 of 0xBCDA to be a binary version 0111_1100_1110_0101 of 0x7CE5. After transmitting commands, the controller 100C may transmit the address (e.g. the write address such as the address processed through the address information rearrangement), and then write data (e.g. the set of write data). For example, the address information rearrangement circuit 120 and the data conversion circuit 140 (more particularly, the data subset rearrangement circuit 142 therein) may utilize respective modulo calculating circuits to apply modulo operators to the die-dependent seeds Seed1 and Seed2, respectively, and more particularly, perform modulo operations on the die-dependent seeds Seed1 and Seed2 to generate modulo operation results, to perform the address information rearrangement and the data subset rearrangement according to these modulo operation results. Similar descriptions of this embodiment are omitted here for brevity.

Figure 4:
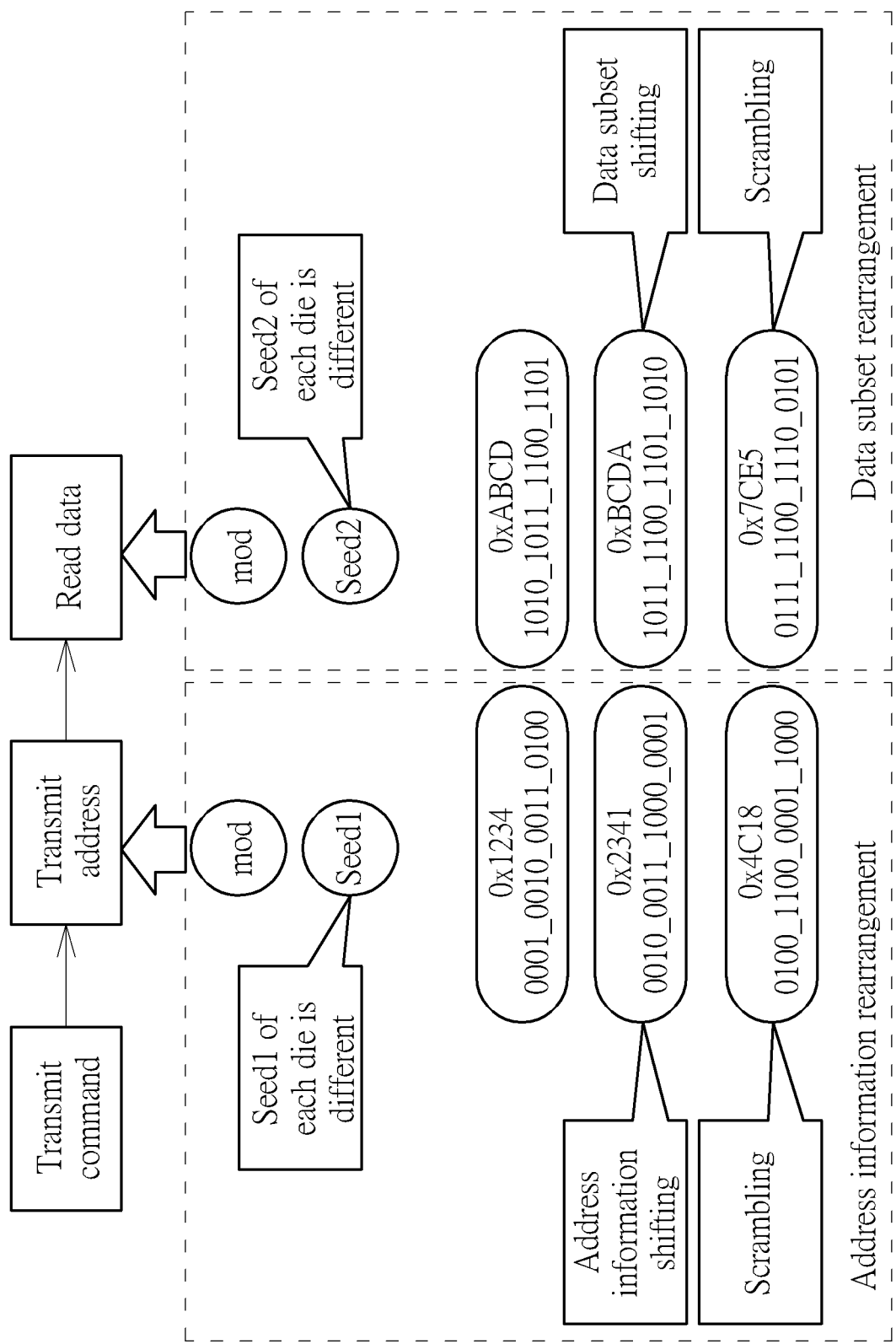
FIG. 4 illustrates a read control scheme of the method shown in FIG. 2 according to an embodiment of the present invention.

FIG. 4 illustrates a read control scheme of the method shown in FIG. 2 according to an embodiment of the present invention. In comparison with the write control scheme shown in FIG. 3, after transmitting the commands, the controller 100C may transmit the address (e.g. the read address such as the address being processed through the address information rearrangement), and then read data (e.g. the set of read data). Similar descriptions of this embodiment are omitted here for brevity.

Figure 5:
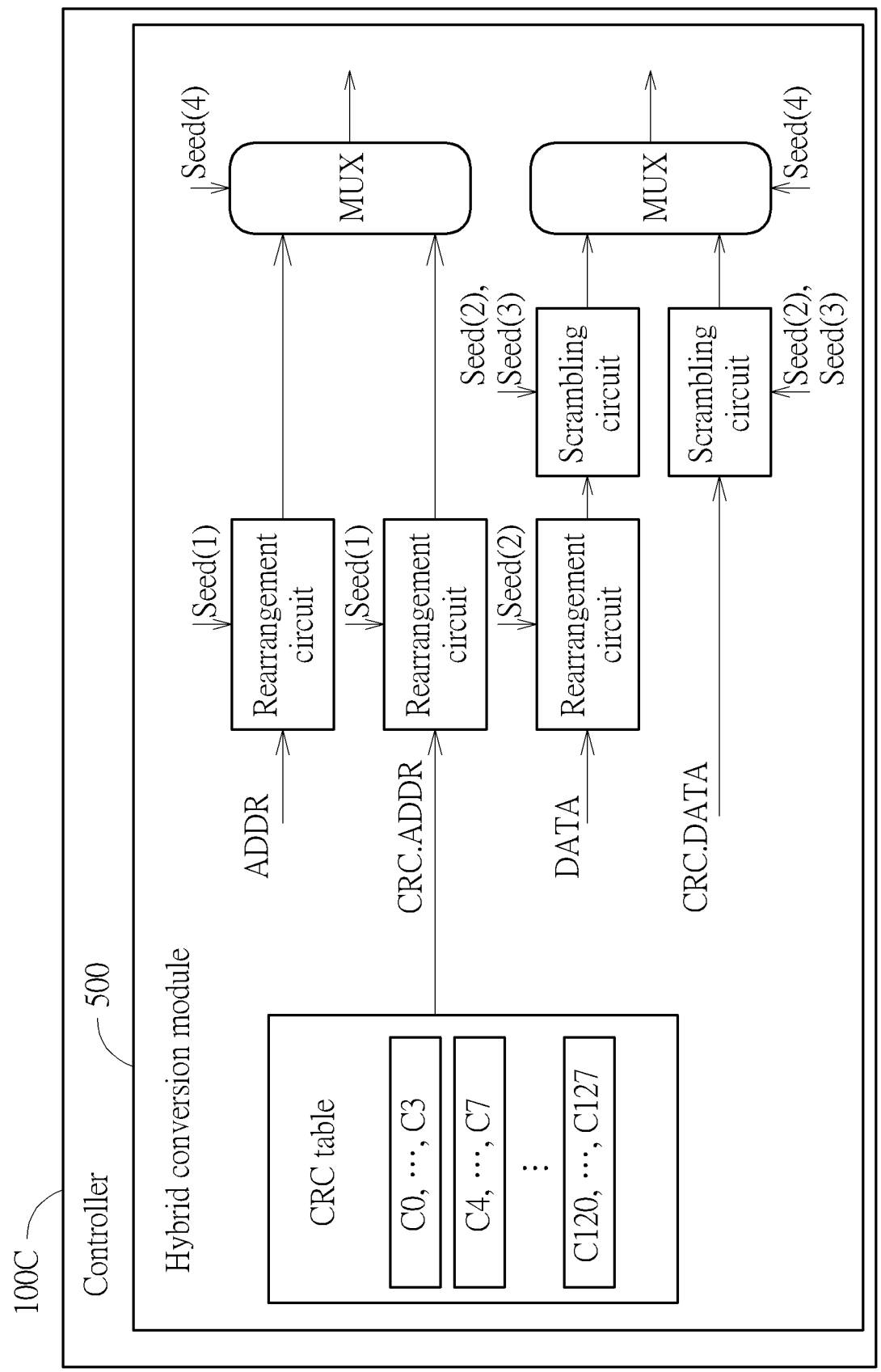
FIG. 5 illustrates a hybrid conversion control scheme of the method shown in FIG. 2 according to an embodiment of the present invention.

FIG. 5 illustrates a hybrid conversion control scheme of the method shown in FIG. 2 according to an embodiment of the present invention. At least one portion (e.g. one portion or all) of the controller side data protection circuit architecture shown in FIG. 1 may be integrated into a hybrid conversion module 500. A certain address and an integrity code such as a cyclic redundancy check (CRC) code thereof may be carried by signals ADDR and CRC.ADDR, respectively, and data on this address and an integrity code such as a CRC code thereof may be carried by signals DATA and CRC.DATA. For example, the hybrid conversion module 500 may calculate integrity codes of a series of data in advance, such as CRC codes {C0, . . . , C3}, {C4, . . . , C7}, {C120, . . . , C127}, etc. thereof, and store these integrity codes such as these CRC codes into a CRC table. In addition, the hybrid conversion module 500 may utilize a rearrangement circuit and a scrambling circuit therein to perform rearrangement according to corresponding seeds such as seeds Seed(1), Seed(2) and Seed(3), and may utilize a multiplexer (MUX) to respectively select one of multiple rearrangement results and one of multiple scrambling results for output according to a corresponding seed such as a seed Seed(4). Similar descriptions of this embodiment are omitted here for brevity.

Figure 6:
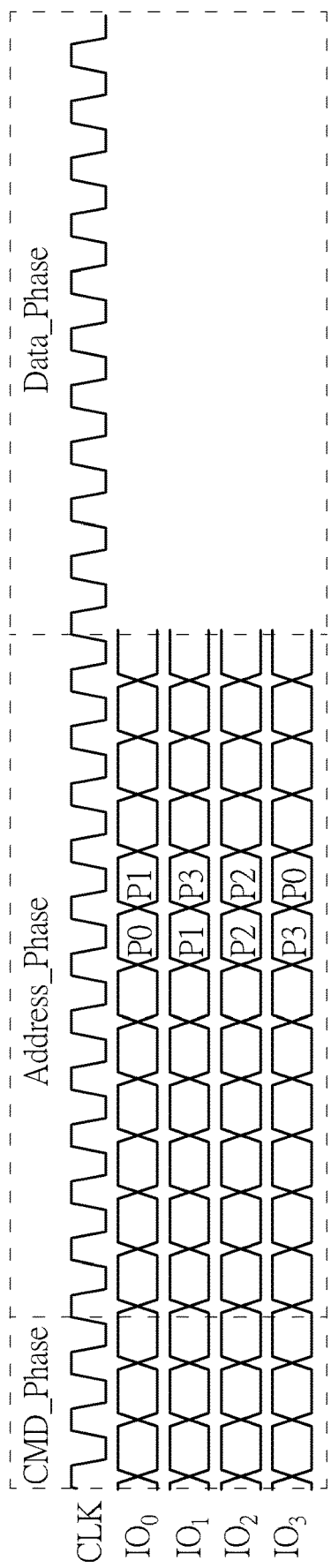
FIG. 6 illustrates an address information rearrangement control scheme of the method shown in FIG. 2 according to an embodiment of the present invention.

FIG. 6 illustrates an address information rearrangement control scheme of the method shown in FIG. 2 according to an embodiment of the present invention. Based on the architecture shown in FIG. 1, the electronic device 100 may comprise multiple physical lines between the controller 100C and the NVM 100M. These physical lines comprise a set of physical lines corresponding to the signals $IO_0$, $IO_1$, $IO_2$ and $IO_3$, and this set of physical lines may be configured to act as the set of address lines or the set of data lines at different time (or phases). More particularly, the controller 100C may perform command transmission, address transmission, and data transmission or reception in a command phase CMD_Phase, an address phase Address_Phase and a data phase Data_Phase, respectively. For example, when the controller 100C performs the address information rearrangement in the address phase Address_Phase, the set of physical lines represent the set of address lines, and the corresponding signals $IO_0$, $IO_1$, $IO_2$ and $IO_3$ transmitted thereon represent address signals. In another example, when the controller 100C perform the data subset rearrangement in the data phase Data_Phase, the set of physical lines represent the set of data lines, and the corresponding signals $IO_0$, $IO_1$, $IO_2$ and $IO_3$ transmitted thereon represent data signals.

According to this embodiment, physical positions of the set of physical lines are physical line positions P0, P1, P2 and P3, and may be exchanged by the aforementioned switches to become any one of various rearrangement results. For example, at a time point, the physical line positions P0, P1, P2 and P3 may be exchanged to become the physical positions P1, P3, P2 and P0; at another time point, the physical line positions P0, P1, P2 and P3 may be exchanged to become the physical line positions P2, P3, P1 and P0; and at other time points, the physical line positions P0, P1, P2 and P3 may be exchanged to become other rearrangement results. Similar descriptions of this embodiment are omitted here for brevity.

According to some embodiments, the data conversion circuit 140 (e.g. the integrity code selective arrangement circuit 144) may determine whether an integrity code transmission function is enabled according to the converted seed Seed3.1, to generate a first determination result, where the first determination result indicates whether the integrity code transmission function is enabled. The integrity code transmission function may be configured to transmit the set of data (e.g. the set of data within Step S24, such as the set of read data) in conjunction with an integrity code of respective integrity codes of multiple sets of data according to the converted seed Seed3.2, and the multiple sets of data comprise the set of data, where the respective integrity codes of the multiple sets of data may be configured to perform error detection of the multiple sets of data. Examples of the aforementioned integrity codes may include, but are not limited to: CRC codes, hash values, parity-check codes, etc. When the first determination result indicates that the integrity code transmission function is enabled, the data conversion circuit 140 (e.g. the integrity code selective arrangement circuit 144) may determine which one of the respective integrity codes of the multiple sets of data is selected to be the integrity code according to the converted seed Seed3.2, to generate a second determination result, where the second determination result indicates which one of the respective integrity codes of the multiple sets of data is selected to be the integrity code, for performing the data conversion. In addition, regarding transmitting the set of data in conjunction with the integrity code, the data conversion circuit 140 (e.g. the integrity code selective arrangement circuit 144) may determine a relative position of the integrity code relative to the multiple subsets of the set of data (e.g. the integrity code such as the CRC code may be located before the set of data, after the set of data, between certain two subsets within the multiple subsets of the set of data) according to the seed Seed3.3, for performing the data conversion. Furthermore, the data conversion circuit 140 (e.g. the integrity code selective arrangement circuit 144) may generate a self-generated integrity code such as a self-generated CRC code according to the corresponding set of data, and compare the integrity code such as the CRC code with the self-generated integrity code such as the self-generated CRC code, where two of them being the same means there is no error, and two of them being different means there is an error. The data conversion circuit 140 (e.g. the integrity code selective arrangement circuit 144) may further determine respective rearrangement positions of the respective integrity codes of the multiple sets of data (e.g. the position at which the integrity code such as the CRC code is positioned, such as positions relative to other integrity codes of the respective integrity codes of the multiple sets of data, and/or positions relative to the multiple sets of data), for performing error detection of the multiple sets of data.

Figure 7:
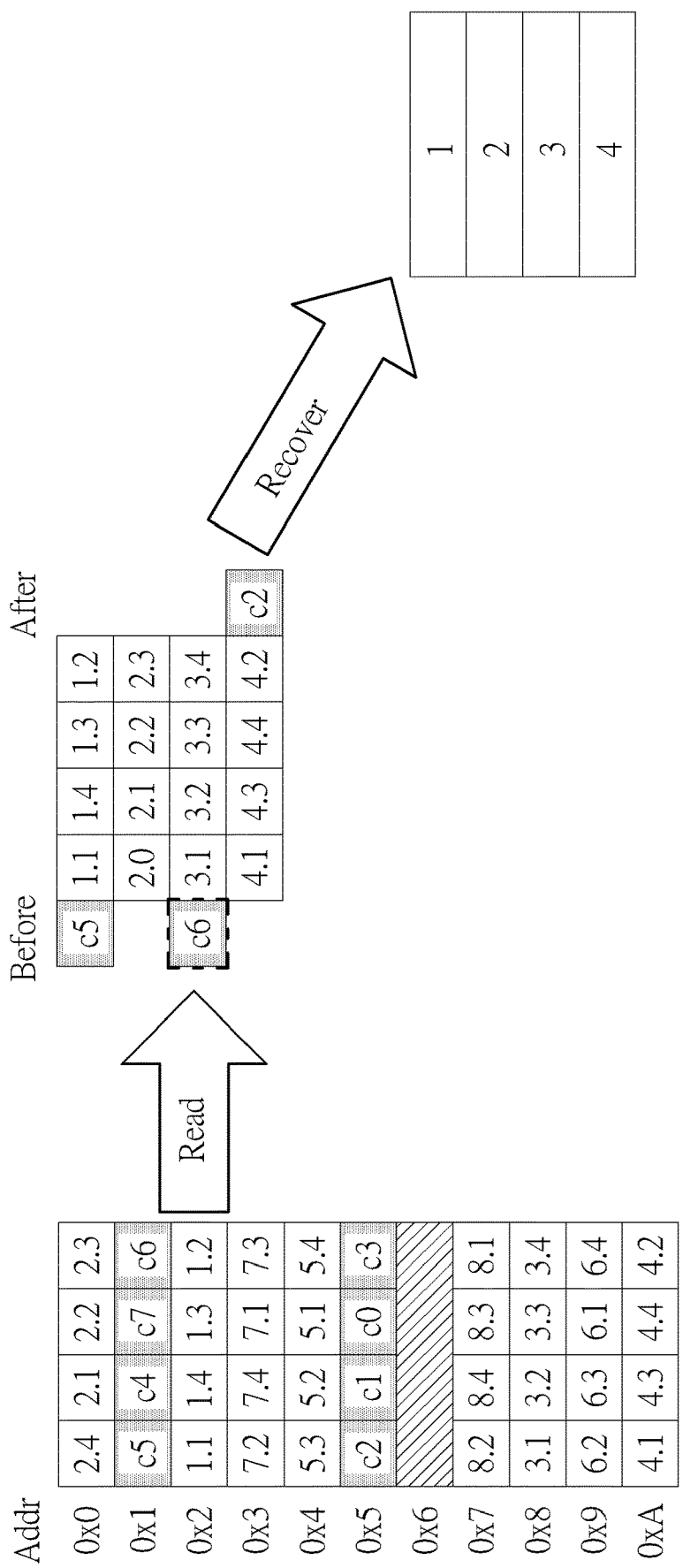
FIG. 7 illustrates a data conversion control scheme of the method shown in FIG. 2 according to an embodiment of the present invention.

FIG. 7 illustrates a data conversion control scheme of the method shown in FIG. 2 according to an embodiment of the present invention. In addition to performing the address information rearrangement and the data subset rearrangement (e.g. performing exchange on physical lines according to the die-dependent seeds Seed1 and Seed2), the controller 100C may utilize the data conversion circuit 140 (e.g. the integrity code selective arrangement circuit 144) to perform integrity code selective arrangement. As this embodiment takes the read phase PHASE(1) as an example for illustration, the NVM 100M (e.g. the NVM side data protection circuit architecture therein) may perform integrity code selective arrangement of itself to generate selective arrangement results, for being output to the controller 100C, and the controller 100C may perform integrity code selective arrangement of itself while reading the NVM 100M, to recover the multiple sets of data.

As shown in FIG. 7, the multiple sets of data such as data 1, 2, 3, 4, 5, 6, 7 and 8, and respective integrity codes thereof such as CRC codes c0, c1, c2, c3, c4, c5, c6 and c7, may be stored in a set of addresses {Addr} such as 0x0, 0x1, 0x2, 0x3, 0x4, 0x5, 0x6, 0x7, 0x8, 0x9 and 0xA in conjunction with dummy data shown by the shading, where the dummy data may be stored in the address 0x6, and the data respective subsets {1.1, 1.2, 1.3, 1.4}, {2.1, 2.2, 2.3, 2.4}, {3.1, 3.2, 3.3, 3.4}, {4.1, 4.2, 4.3, 4.4}, {5.1, 5.2, 5.3, 5.4}, {6.1, 6.2, 6.3, 6.4}, {7.1, 7.2, 7.3, 7.4} and {8.1, 8.2, 8.3, 8.4} of the data 1, 2, 3, 4, 5, 6, 7 and 8, and the CRC codes {0x0, 0x1, 0x2, 0x3} and {c4, c5, c6, c7} may be rearranged and stored in other addresses within the set of addresses {Addr}, respectively.

According to this embodiment, the controller 100C may read the NVM 100M at a certain time point to receive the rearranged subset {1.1, 1.2, 1.3, 1.4}, {2.1, 2.2, 2.3, 2.4}, {3.1, 3.2, 3.3, 3.4} and {4.1, 4.2, 4.3, 4.4} carried by the signals $IO_0$, $IO_1$, $IO_2$ and $IO_3$ from the NVM 100M, in conjunction with the CRC codes c5, c6 and c2 randomly appearing before or after them, and may recover the data 1, 2, 3 and 4 from the data carried by the signals $IO_0$, $IO_1$, $IO_2$ and $IO_3$, e.g. through the integrity code selective arrangement and the data subset rearrangement of itself. More particularly, the data conversion circuit 140 (e.g. the integrity code selective arrangement circuit 144) may perform error detection on the data 6 according to the CRC code c6 (which is read before or later). Similar descriptions of this embodiment are omitted here for brevity.

Figure 8:
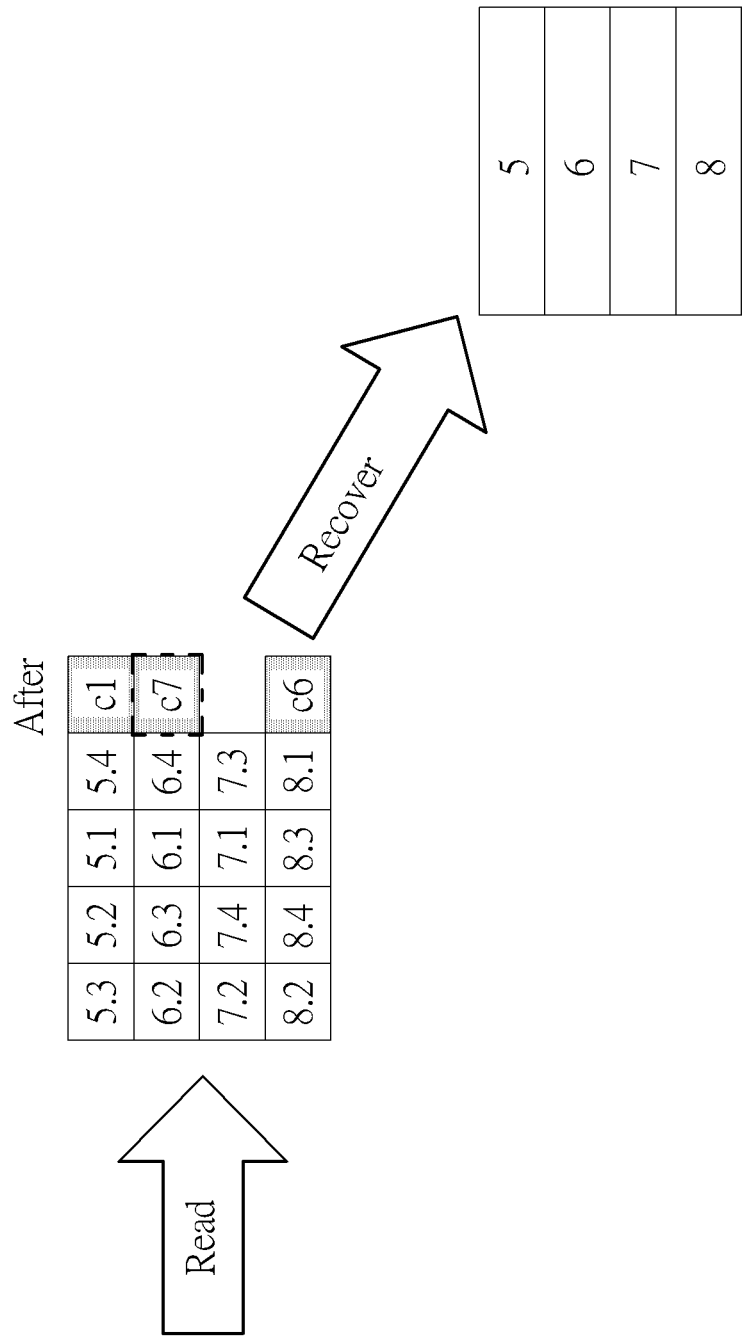
FIG. 8 illustrates another example of read and recovery operations of the data control scheme shown in FIG. 7.

FIG. 8 illustrates another example of read and recovery operations of the data control scheme shown in FIG. 7. The controller 100C may read the NVM 100M at another time point to receive the rearranged subsets {5.1, 5.2, 5.3, 5.4}, {6.1, 6.2, 6.3, 6.4}, {7.1, 7.2, 7.3, 7.4} and {8.1, 8.2, 8.3, 8.4} carried by the signals $IO_0$, $IO_1$, $IO_2$ and $IO_3$ from the NVM 100M, in conjunction with the CRC codes c1, c7 and c6 randomly appearing after them, and may recover the data 5, 6, 7 and 8 from the data carried by the signals $IO_0$, $IO_1$, $IO_2$ and $IO_3$, e.g. through the integrity code selective arrangement and the data subset rearrangement of itself. More particularly, the data conversion circuit 140 (e.g. the integrity code selective arrangement circuit 144) may perform error detection on the data 7 according to the CRC code c7. Similar descriptions of this embodiment are omitted here for brevity.

Figure 9:
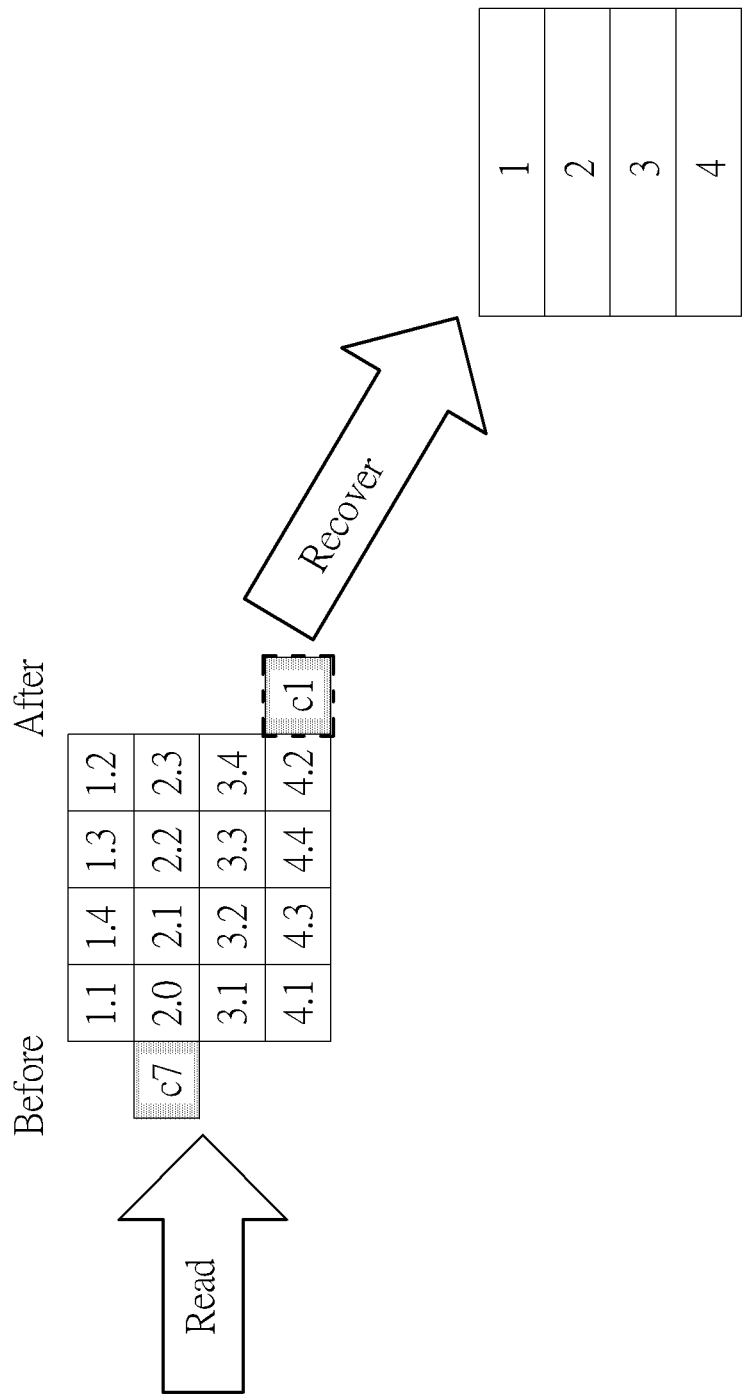
FIG. 9 illustrates another example of read and recovery operations of the data control scheme shown in FIG. 7.

FIG. 9 illustrates another example of read and recovery operations of the data control scheme shown in FIG. 7. The controller 100C may read the NVM 100M at another time point to receive the rearranged subsets {1.1, 1.2, 1.3, 1.4}, {2.1, 2.2, 2.3, 2.4}, {3.1, 3.2, 3.3, 3.4} and {4.1, 4.2, 4.3, 4.4} carried by the signals $IO_0$, $IO_1$, $IO_2$ and $IO_3$ from the NVM 100M, in conjunction with the CRC codes c7 and c1 randomly appearing before or after them, and may recover the data 1, 2, 3 and 4 from the data carried by the signals $IO_0$, $IO_1$, $IO_2$ and $IO_3$, e.g. through the integrity code selective arrangement and the data subset rearrangement of itself. More particularly, the data conversion circuit 140 (e.g. the integrity code selective arrangement circuit 144) may perform error detection on the data 1 according to the CRC code c1. Similar descriptions of this embodiment are omitted here for brevity.

Figure 10:
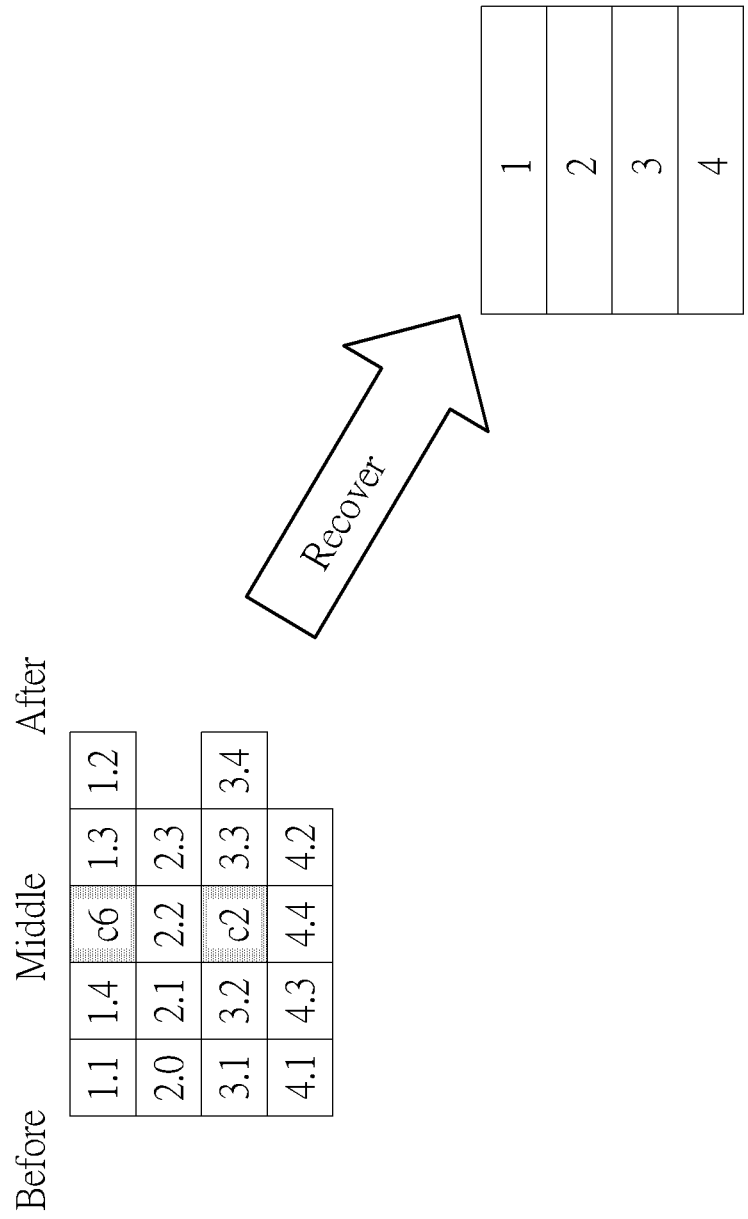
FIG. 10 illustrates another example of read and recovery operations of the data control scheme shown in FIG. 7.

FIG. 10 illustrates another example of read and recovery operations of the data control scheme shown in FIG. 7. The controller 100C may read the NVM 100M at another time point to receive the rearranged subsets {1.1, 1.2, 1.3, 1.4}, {2.1, 2.2, 2.3, 2.4}, {3.1, 3.2, 3.3, 3.4} and {4.1, 4.2, 4.3, 4.4} carried by the signals $IO_0$, $IO_1$, $IO_2$ and $IO_3$ from the NVM 100M, in conjunction with the CRC codes c6 and c2 randomly appearing therein (e.g. between some subsets), and may recover the data 1, 2, 3 and 4 from the data carried by the signals $IO_0$, $IO_1$, $IO_2$ and $IO_3$, e.g. through the integrity code selective arrangement and the data subset rearrangement of itself. Similar descriptions of this embodiment are omitted here for brevity.

Based on the above embodiments, the present invention provides an apparatus for performing data protection regarding the NVM 100M. Examples of the apparatus may include, but are not limited to: the electronic device 100, the controller 100C and the controller side data protection circuit architecture therein, the NVM 100M and the NVM side data protection circuit architecture therein, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data protection regarding a non-volatile memory (NVM), the method being applicable to a controller, the method comprising:
    obtaining a first die-dependent seed and a second die-dependent seed, wherein the first die-dependent seed and the second die-dependent seed correspond to a die for implementing the NVM;
    performing rearrangement on multiple sets of address information of an address according to the first die-dependent seed, for protecting the address carried by at least one address signal between the controller and the NVM; and
    performing rearrangement on multiple subsets of a set of data according to the second die-dependent seed, for protecting the set of data carried by at least one data signal between the controller and the NVM.

2. The method of claim 1, wherein the controller comprises a storage unit; and the step of obtaining the first die-dependent seed and the second die-dependent seed further comprises:
    obtaining at least one die-dependent seed among the first die-dependent seed and the second die-dependent seed from the storage unit, wherein the at least one die-dependent seed is stored in the storage unit in advance.

3. The method of claim 1, wherein the step of performing the rearrangement on the multiple sets of address information of the address according to the first die-dependent seed further comprises:
    utilizing a set of switches to perform exchange on two or more address lines within a set of address lines according to the first die-dependent seed, to rearrange the multiple sets of address information of the address.

4. The method of claim 1, wherein the step of performing the rearrangement on the multiple subsets of the set of data according to the second die-dependent seed further comprises:
    utilizing a set of switches to perform exchange on two or more data lines within a set of data lines according to the second die-dependent seed, to rearrange the multiple subsets of the set of data.

5. The method of claim 1, wherein the step of obtaining the first die-dependent seed and the second die-dependent seed further comprises:
    parsing a header of information from the NVM, to obtain at least one die-dependent seed among the first die-dependent seed and the second die-dependent seed from the header.

6. The method of claim 1, further comprising:
    utilizing a seed generator within the controller to generate an initial seed, wherein the initial seed varies and is updated with time;
    utilizing multiple seed converters within the controller to convert the initial seed into multiple converted seeds, respectively, for performing data conversion, wherein the multiple converted seeds vary and are updated with the initial seed, and the multiple converted seeds comprise a first converted seed and a second converted seed; and
    determining whether an integrity code transmission function is enabled according to the first converted seed, to generate a first determination result, wherein the integrity code transmission function is configured to transmit the set of data in conjunction with an integrity code of respective integrity codes of multiple sets of data according to the second converted seed, the multiple sets of data comprise the set of data, and the first determination result indicates whether the integrity code transmission function is enabled.

7. The method of claim 6, wherein the first determination result indicates that the integrity code transmission function is enabled; and the method further comprises:
    determining which one of the respective integrity codes of the multiple sets of data is selected to be the integrity code according to the second converted seed, to generate a second determination result, wherein the second determination result indicates which one of the respective integrity codes of the multiple sets of data is selected to be the integrity code, for performing the data conversion.

8. The method of claim 7, wherein the multiple converted seeds comprise a third converted seed, and the method further comprises:
    regarding transmitting the set of data in conjunction with the integrity code, determining a relative position of the integrity code relative to the multiple subsets of the set of data according to the third converted seed, for performing the data conversion.

9. The method of claim 7, wherein the multiple converted seeds comprise a fourth converted seed, and the method further comprises:

determining whether to utilize the integrity code to perform error detection of a corresponding set of data within the multiple sets of data according to the fourth converted seed.

10. The method of claim 9, wherein the multiple converted seed comprises a fifth converted seed, and the method further comprises:

determining respective rearranged positions of the respective integrity codes of the multiple sets of data according to the fifth converted seed, for performing error detection of the multiple sets of data.

11. A controller, applicable to data protection regarding a non-volatile memory (NVM), the controller comprising:

a core circuit, configured to control the controller according to predetermined information loaded from the NVM to control operations of an electronic device, wherein the electronic device comprises the controller and the NVM;

an address information rearrangement circuit, coupled to the core circuit, configured to perform address information rearrangement, wherein the address information rearrangement circuit obtains a first die-dependent seed, and performs rearrangement on multiple sets of address information of an address according to the first die-dependent seed, for protecting the address carried by at least one address signal between the controller and the NVM;

a data conversion circuit, coupled to the core circuit, configured to perform data conversion, wherein the data conversion circuit obtains a second die-dependent seed, and performs rearrangement on multiple subsets of a set of data according to the second die-dependent seed, for protecting the set of data carried by at least one data signal between the controller and the NVM;

wherein the first die-dependent seed and the second die-dependent seed correspond to a die for implementing the NVM.

12. The controller of claim 11, further comprising:

a storage unit, wherein the controller obtains at least one die-dependent seed among the first die-dependent seed and the second die-dependent seed from the storage unit, and the at least one die-dependent seed is stored in the storage unit in advance.

13. The controller of claim 11, wherein the address information rearrangement circuit comprises:

a set of switches, configured to perform exchange on two or more address lines within a set of address lines according to the first die-dependent seed, to rearrange the multiple sets of address information of the address.

14. The controller of claim 11, wherein the data conversion circuit comprises a set of switches, configured to perform exchange on two or more data lines within a set of data lines according to the second die-dependent seed, to rearrange the multiple subsets of the set of data.

15. The controller of claim 11, wherein the controller parses a header of information from the NVM, to obtain at least one die-dependent seed among the first die-dependent seed and the second die-dependent seed from the header.

16. The controller of claim 11, further comprising:

a seed generator, configured to generate an initial seed, wherein the initial seed varies and is updated with time; and multiple seed converters, configured to convert the initial seed into multiple converted seeds, respectively, for performing data conversion, wherein the multiple converted seeds vary and are updated with the initial seed, and the multiple converted seeds comprise a first converted seed and a second converted seed;

wherein the data conversion circuit determines whether an integrity code transmission function is enabled according to the first converted seed, to generate a first determination result, wherein the integrity code transmission function is configured to transmit the set of data in conjunction with an integrity code of respective integrity codes of multiple sets of data according to the second converted seed, the multiple sets of data comprise the set of data, and the first determination result indicates whether the integrity code transmission function is enabled.

17. The controller of claim 16, wherein when the first determination result indicates that the integrity code transmission function is enabled, the data conversion circuit determines which one of the respective integrity codes of the multiple sets of data is selected to be the integrity code according to the second converted seed to generate a second determination result, wherein the second determination result indicates which one of the respective integrity codes of the multiple sets of data is selected to be the integrity code, for performing the data conversion.

18. The controller of claim 11, wherein when the die is replaced with another die for implementing the NVM, the first die-dependent seed and the second die-dependent seed are updated to correspond to the other die.

19. An electronic device comprising the controller of claim 11, wherein the electronic device comprises the NVM.

20. An apparatus for performing data protection regarding a non-volatile memory (NVM), the apparatus comprising:

an address information rearrangement circuit, configured to perform address information rearrangement, wherein the address information rearrangement circuit obtains a first die-dependent seed, and performs rearrangement on multiple sets of address information of an address according to the first die-dependent seed, for protecting the address carried by at least one address signal between a controller and the NVM;

a data conversion circuit, configured to perform data conversion, wherein the data conversion circuit obtains a second die-dependent seed, and performs rearrangement on multiple subsets of a set of data according to the second die-dependent seed, for protecting the set of data carried by at least one data signal between the controller and the NVM;

wherein the first die-dependent seed and the second die-dependent seed correspond to a die for implementing the NVM.

* * * * *